United States Patent [19]
Finch

[11] 3,752,223

[45] Aug. 14, 1973

[54] AIR CONDITIONING APPARATUS FOR AUTOMOTIVE VEHICLES

[75] Inventor: Kenneth W. Finch, Fort Wayne, Ind.

[73] Assignee: International Harvester Company, Chicago, Ill.

[22] Filed: July 31, 1972

[21] Appl. No.: 276,504

[52] U.S. Cl. .................. 165/43, 98/31 SV
[51] Int. Cl. ............................. G60h 3/00
[58] Field of Search .............. 98/41 SV; 165/16, 165/17, 27, 33, 34, 42, 43

[56] References Cited
UNITED STATES PATENTS

| | | | |
|---|---|---|---|
| 2,796,820 | 6/1957 | Moore et al. | 165/43 |
| 2,864,590 | 12/1958 | Moore | 165/43 |
| 3,223,019 | 12/1965 | Schuh | 98/41 SV |
| 3,415,311 | 12/1968 | Sheppard et al. | 165/33 |

Primary Examiner—Charles J. Myhre
Assistant Examiner—Theophil W. Streule, Jr.
Attorney—Floyd B. Harman

[57] ABSTRACT

An air conditioning apparatus for an automotive vehicle including an air distribution duct assembly incorporating a pair of relatively slidably movable elongated ducts for distributing air to selected locations in the vehicle and utilizing a single lever to selectively open and close air discharge openings in the duct assembly.

8 Claims, 9 Drawing Figures

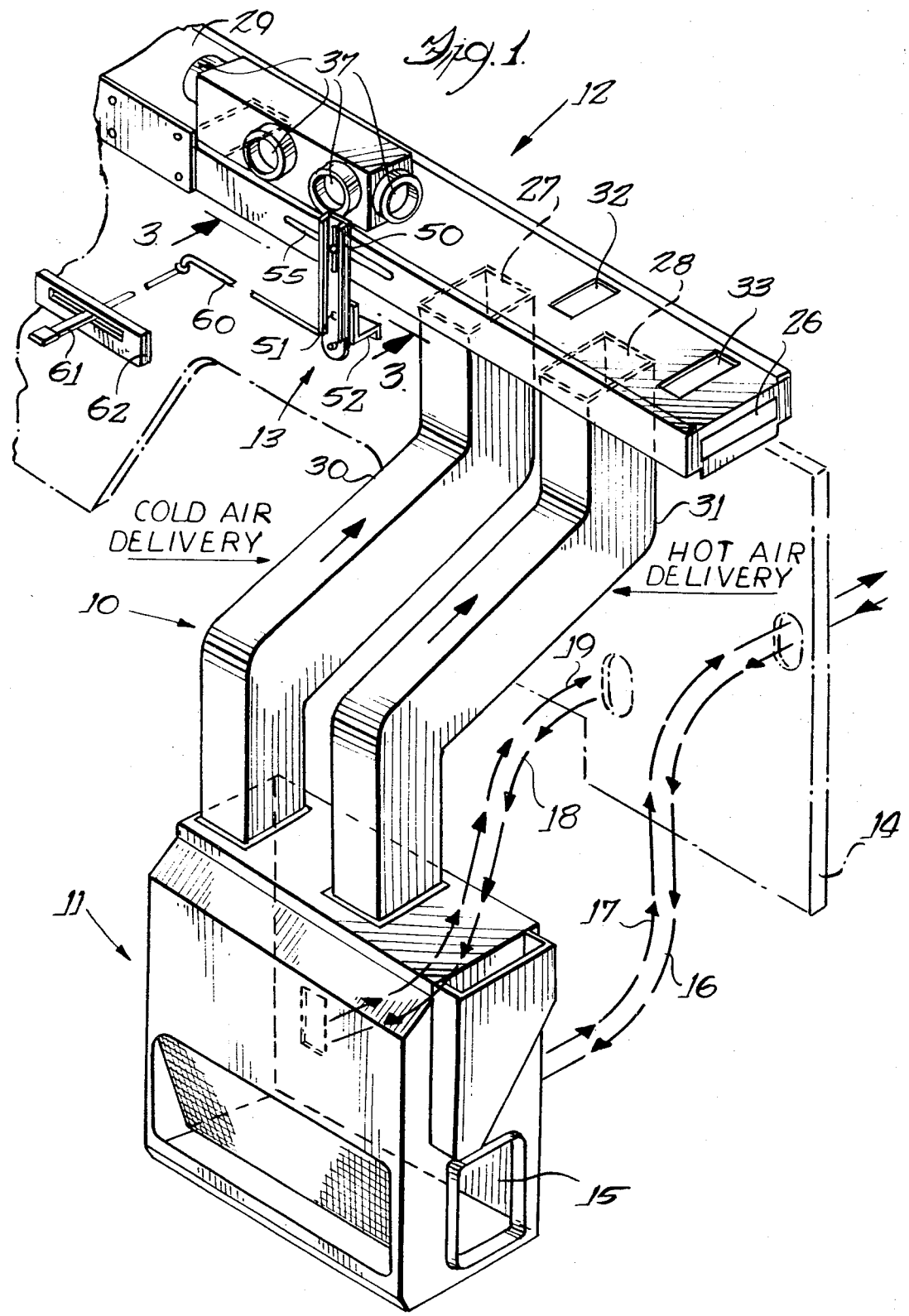

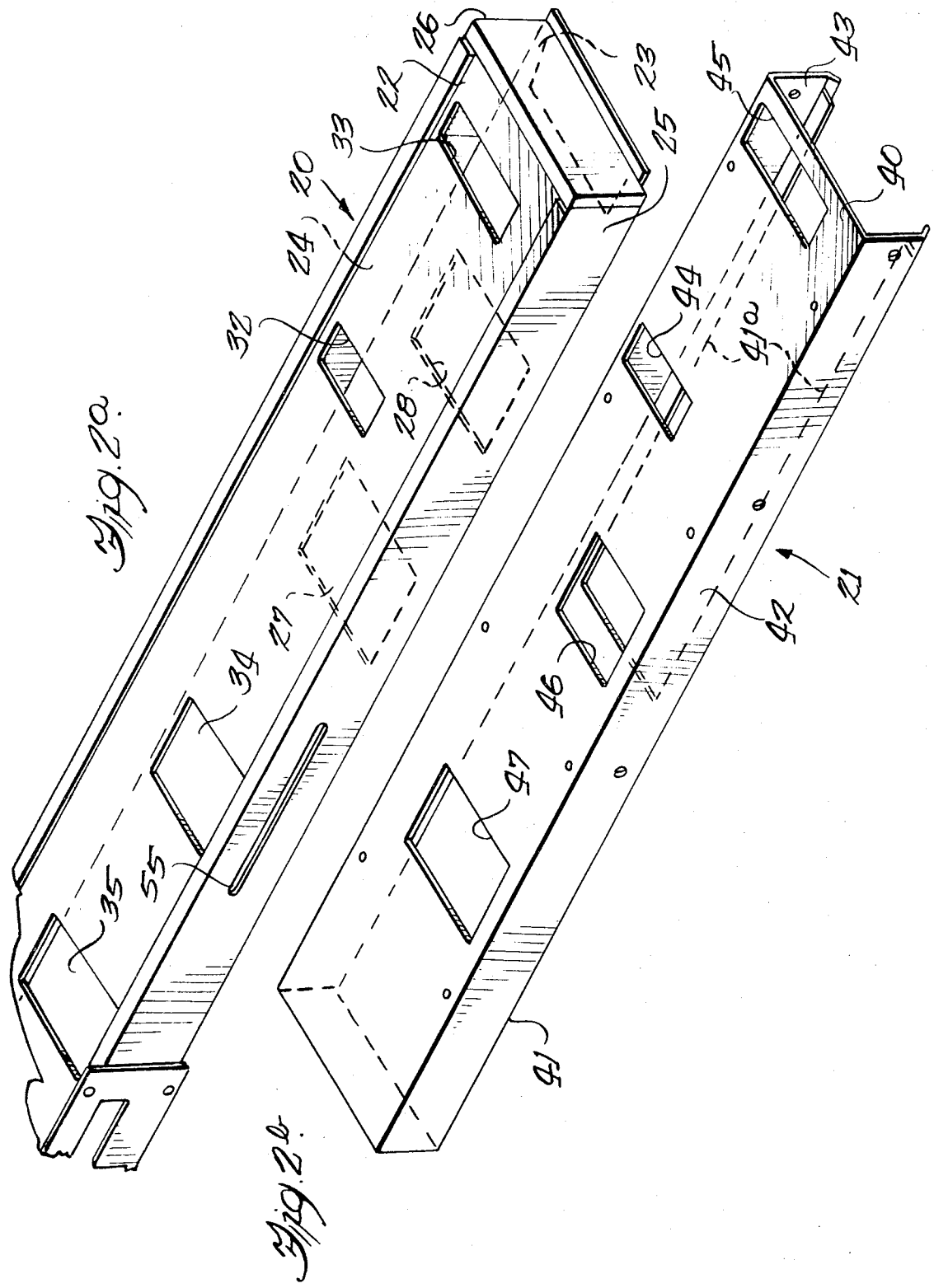

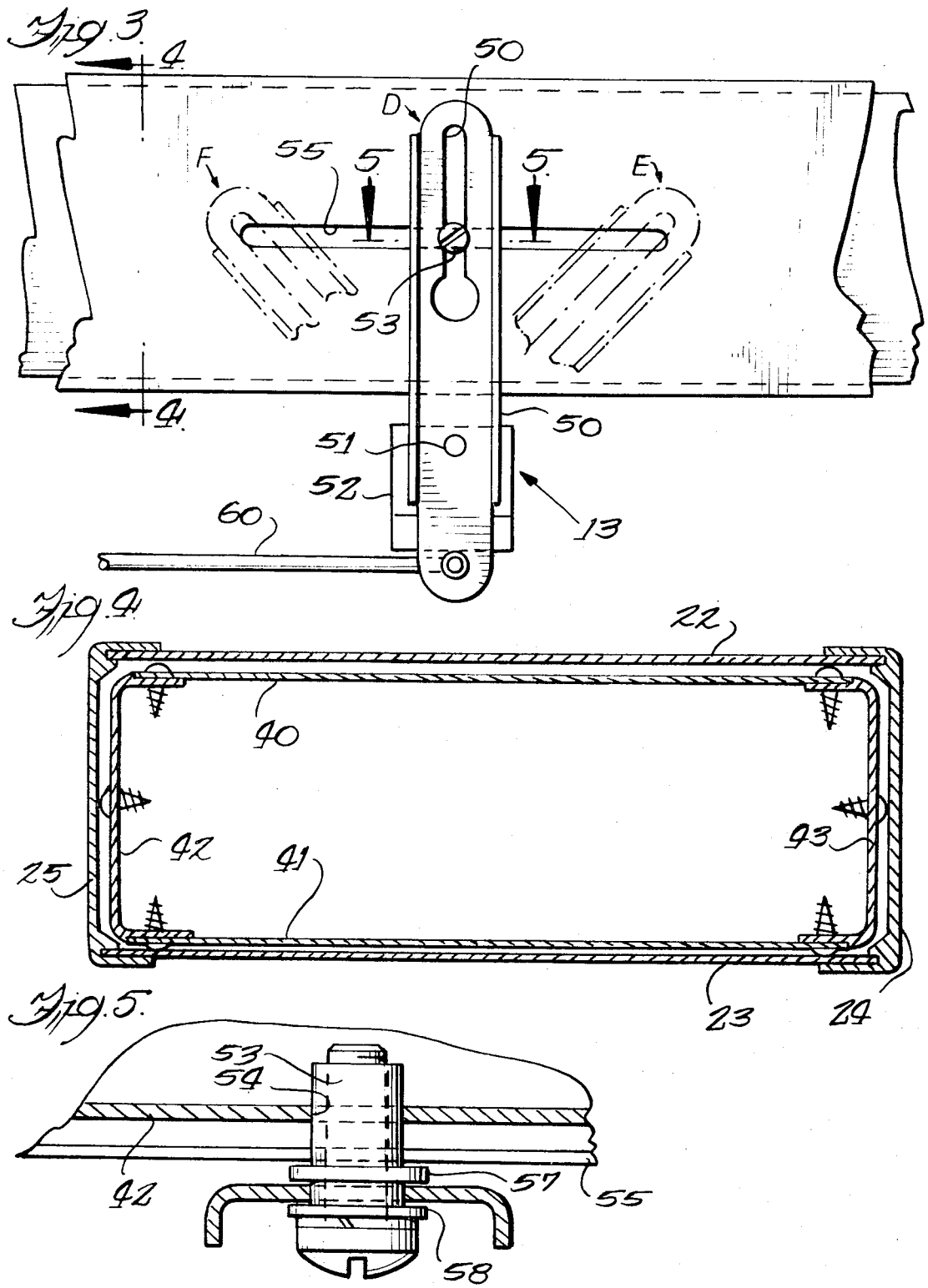

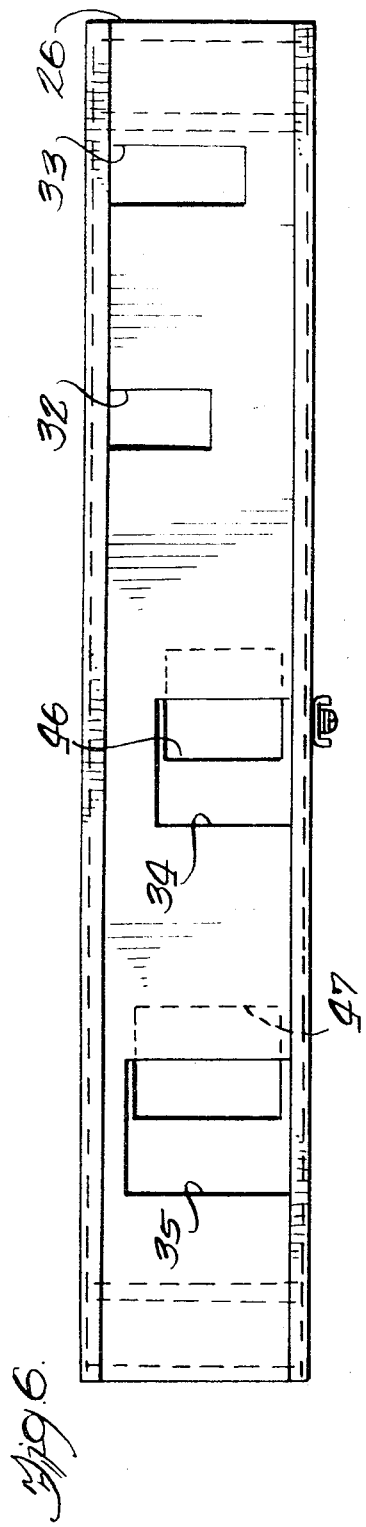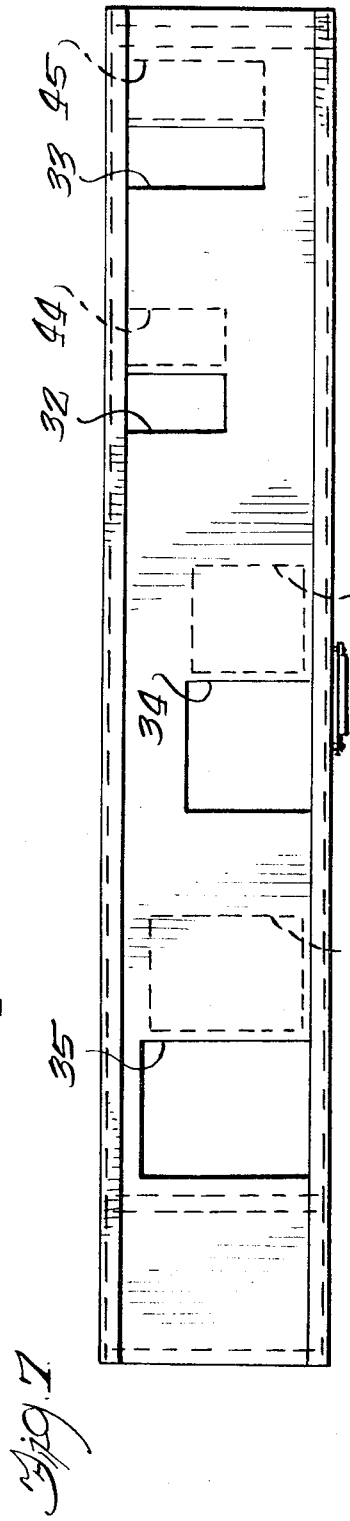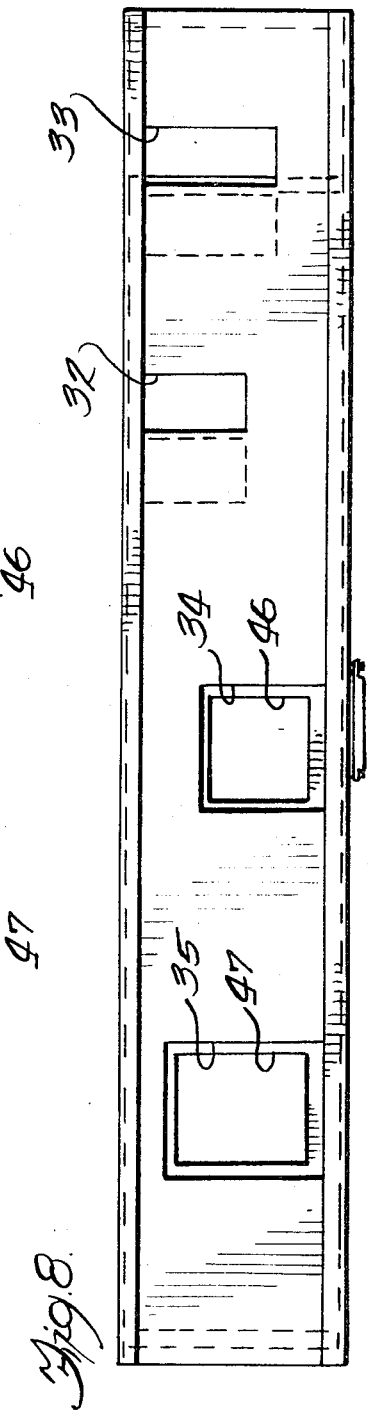

AIR CONDITIONING APPARATUS FOR AUTOMOTIVE VEHICLES

This invention relates to an air conditioning system for automotive vehicles and more particularly to a novel air distribution means associated with the apparatus.

Air distribution systems for automotive vehicles are plagued with a number of problems including a necessity for a plurality of dampers and bowden wire control arrangements with their inherent difficulties. Accordingly, it has become desirable to provide in a vehicle air conditioning system more simplified apparatus which is not burdened by a plurality of moving parts and which is easy to manufacture and install.

SUMMARY OF THE INVENTION

It is a principal object of this invention to provide an air conditioning system for an automotive vehicle having a novel air distribution apparatus.

Another object is to provide a simple air distribution duct assembly containing a plurality of air outlets which may be selectively opened and closed to send conditioned air to desired locations within the vehicle.

Briefly summarized, the invention herein comprises an air distribution duct assembly which has two elongated ducts, one being disposed within the other and slidably positionable with respect to the other to selectively position air discharge openings which in turn are connected to air discharge means in various areas of the vehicle.

DESCRIPTION OF THE DRAWINGS

FIG. 1 is an exploded view in perspective of a portion of an air conditioning system embodying the invention herein;

FIG. 2a is a view in perspective of the stationary outer air distribution duct;

FIG. 2b is a view in perspective of a second inner air distribution duct slidable within the outer duct shown in FIG. 2a;

FIG. 3 is an enlarged view in elevation of the selector mechanism taken along line 3—3 of FIG. 1;

FIG. 4 is a view in vertical section taken along the line 4—4 of FIG. 3;

FIG. 5 is an enlarged view of the connecting means interconnecting the selector mechanism with the inner duct of FIG. 2b;

FIGS. 6, 7 and 8 are top views showing the relative positions of the inner and outer ducts for the different operating modes.

DESCRIPTION OF THE PREFERRED EMBODIMENT

The term air conditioning apparatus is used herein in its broadest sense to mean conditioning of air, i.e., to include both heating and cooling.

The air conditioning apparatus 10 embodying the invention herein is shown in an exploded perspective in FIG. 1. It includes an air conditioning unit 11, an air distribution duct assembly 12, and a selector mechanism 13. The air conditioning apparatus 10 would normally be positioned in the passenger compartment of the vehicle which is separated from the engine compartment by a partition wall 13 sometimes referred to as a dash panel. The air conditioning unit 11 is adapted to receive atmospheric air through an inlet 15, to which is connected an inlet conduit (not shown) which in turn communicates with the atmosphere outside the vehicle. The unit 11 is provided with hot water inlet and outlet conduits 16 and 17 connected by a suitable arrangement with the radiator of the vehicle so that hot water may be circulated from the radiator (not shown) to a heating core (not shown) within the unit 11 and back again. The unit 11 also may contain a cooling core (not shown) with which inlet and outlet conduits 18 and 19 are connected and lead to a refrigerant source (not shown).

The air distribution assembly 12 includes an elongated outer duct 20 and an elongated inner duct 21 which is slidably disposed within duct 20 to slide along the longitudinal axis of the two ducts. These two ducts may be of plastic or sheet metal construction. Outer duct 20 comprises an elongated structure preferably of rectangular cross-section including top wall 22, bottom wall 23, side walls 24 and 25 and end wall 26 which closes duct 20 at its right end. The opposite end of duct 20 is open to provide a discharge opening 29 for heated air. It may be fitted with a vane control (not shown) for selectively closing that end if desired. A pair of air inlet apertures 27 and 28 are formed in bottom wall 23 to which are connected respectively cold air delivery conduit 30 and warm air delivery conduit 31 which are connected to unit 11 to deliver air from the latter to the duct arrangement 12. The unit 11 may be located in closer proximity to wall 23 of outer duct 20 or by relatively short coupling conduits extending between the unit 11 and apertures 27 and 28 in the bottom wall 23.

A pair of longitudinally spaced air apertures 32 and 33 are formed in the right end of the top wall 22 and are adapted to be connected by suitable conduits (not shown) to window defrost stations in the vehicle compartment. Additional air outlet apertures 34 and 35 are formed in top wall 22. The left end of duct 20 provides an exit for heated air and is provided with a variable opening (not shown) which may be controlled by a hand operated vane mechanism (not shown).

A box-like cold air manifold 36 is attached to the top wall 22 and is positioned over the openings 34 and 35 in communication with those openings. The cold air manifold 36 may be provided with several air discharge openings 37 each of which are adapted to be connected to conduits (not shown) leading to different sections of the vehicle compartment.

The inner duct 21 of the air distribution assembly is an elongated structure which is closely fitted inside duct 20 with enough clearance to provide easy slidability therein. Duct 21 includes a top wall 40, bottom wall 41 and side walls 42 and 43 which may be formed in a manner as shown in FIG. 4. Air outlet apertures 44, 45, 46 and 47 are formed in top wall 40. Bottom wall 41 is formed with a cut-out portion 41a which extends about half the length of duct 21, the length of the cut-out portion depending on the position of the air outlet apertures. Apertures 44 and 45 preferably are smaller than apertures 46 and 47 because they are intended as discharge openings to window defrost stations as further shown herein. Apertures 44 and 45 are of substantially the same size as apertures 32 and 33 respectively of duct 20 (See FIGS. 2a, 2b, and 7) and are longitudinally spaced the same distance as apertures 32 and 33, so that they may be moved simultaneously into register therewith. Apertures 46 and 47 are of substantially the same size as apertures 34 and 35 respectively of duct 20 and are longitudinally spaced the same distance as apertures 34 and 35 so that they may be moved simultaneously into register therewith as may be seen from FIG. 8.

The selector mechanism 13 comprises an elongated lever arm 50 which is pivotally mounted at 51 on a bracket 52 attached to the partition wall 14. A guide bolt or pin 53 is fitted into an aperture 54 of side wall 42 of duct 21 and extends through a horizontally extending slot 55 in side wall 25 of outer duct 20. The guide bolt or pin 53 also extends through vertically extending slot 56 in lever arm 50. Two guide flanges 57 and 58 serve to hold the guide bolt 53 in place in the lever arm 50 and side wall 42. The slot 56 is of sufficient width to permit the guide bolt to move throughout the length thereof as the lever arm 50 is rotated about its pivot 51. A linkage arm 60 is attached to the lower end of the lever arm 50 and an actuating lever 61 is attached to the other end of linkage arem 60. A suitable pivotal mounting for the lever 61 is provided in conjunction with an indicator panel 62. Pivotal actuation of the lever 61 in a horizontal plane (as seen in FIG. 1) will actuate the lever arm 50 to any one of three selected positions as shown in FIG. 3.

The air conditioning apparatus 10 can be set to provide either heating, cooling or defrosting. If either defrosting or heating are desired suitable controls (not shown) are manipulated to permit circulation of hot water via conduit 16 to the heating core in unit 11. To set the apparatus in a defrosting mode the lever arm 50 is moved to its center position D by the selector lever 61 (as shown in FIG. 3). By this action, the lever arm 50 moves the inner duct 21, to which pin 53 is attached, to the position shown in FIG. 6. In that position apertures 44 and 45 of inner duct 21 are in register with apertures 32 and 33 respectively of outer duct 20, the apertures 32 and 33 being connected to window defrosting stations in the vehicle compartment. It will be observed that in this defrost position the passage of heated air from the unit 11 through conduit 31 to distribution duct assembly 13 is not obstructed. Heated air enters the distribution duct assembly 13 through aperture 28, moves through cut-out portion or open area 41a in the bottom wall 41 and thence through apertures 44, 45 and 32, 33.

If the heating mode is desired, lever 61 is manipulated to pivot lever arm 50 to the right to position E as shown in FIG. 3. This moves inner duct 21 to a position as shown in FIG. 7. In that position the defrost apertures 44, 45 and 32, 33 are no longer in register with each other. All apertures in the top wall of outer duct 20 are blocked. The heated air moves to the only open outlet 29 at the left end of the assembly 13 which may be connected to various heating stations throughout the vehicle compartment.

If the cooling mode is desired controls (not shown) are manipulated to circulate refrigerant to the cooling core in unit 11. Then lever 61 is manipulated to pivot lever 50 to the left to position F as shown in FIG. 8. In that position the defrost apertures 32 and 33 are closed. The air cooling system in unit 11 which now has been put into operation delivers cold air via conduit 30 into inner duct 21 and through apertures 46, 47 and 34, 35 which are now in register with each other as shown in FIG. 8. Apertures 46 and 47, of course, are in direct communication with manifold 36 from which cold air is distributed through openings 37 to various stations in the vehicle compartment.

It will be seen that I have advantageously provided in vehicle air conditioning apparatus a simplified air distribution duct assembly which is of simple construction, has few moving parts and is easy to manipulate in selecting a variety of air conditioning modes.

While a preferred embodiment of the invention has been specifically disclosed, it is to be understood that the invention is not limited thereto as other variations will be apparent to those skilled in the art and the invention is to be given its fullest interpretation within the terms of the following claims.

I claim:

1. Air conditioning apparatus for an automotive vehicle comprising:
   an air conditioning unit;
   means for admitting air to said air conditioning unit;
   means associated with said air conditioning unit for conditioning air admitted to said air conditioning unit;
   air distribution means operatively connected to said air conditioning unit for receiving air therefrom and distributing the conditioned air, said air distribution means including,
   a first elongated outer duct member,
   a second elongated inner duct member slidably disposed within said first elongated duct member;
   air discharge opening means in said air distribution means including means defining openings in each of said duct members which may be moved into register with each other to distribute conditioned air to selected locations;
   duct actuating means for moving one duct member longitudinally relative to the other; and
   selector means connected to said duct actuating means for actuating the latter.

2. The combination of claim 1 including
   means connecting said duct actuating means to said inner duct member whereby the latter may be slidably moved longitudinally with respect to said outer duct means.

3. The combination of claim 1 wherein
   said air conditioning unit includes both a heating core and cooling core and separate conduit means from each leading to said air distribution means.

4. The combination of claim 1 wherein
   said outer duct member includes at least one air discharge opening adapted to be connected to a defrosting station, at least one air discharge opening adapted to be connected to a heating station, and at least one cold air discharge opening adapted to be connected to an air cooling station.

5. The combination of claim 4 including
   a cold air manifold operatively connected to said cold air discharge opening formed in said outer duct member, said cold air manifold being adapted to distribute cold air to a plurality of stations in the vehicle compartment with which said air conditioning apparatus is associated.

6. The combination of claim 1 wherein
   said outer and inner duct members each have formed in adjacent walls thereof at least one warm air discharge opening adapted to be brought into register with each other by actuation of said selector means to distribute warm air to at least one selected station.

7. The combination of claim 1 wherein said opening means include
warm air discharge opening means formed in adjacent walls of said outer and inner duct members and adapted to be brought into register with each other by actuation of said selector mechanism;
cold air discharge opening means formed in adjacent walls of outer and inner duct member and adapted to be brought into register with each other by actuation of said selector mechanism.

8. The combination of claim 7 including
additional warm air discharge outlet formed in one end of each of said inner and outer duct members.

* * * * *